March 8, 1966 M. E. RODGERS 3,239,253
CONNECTOR-COUPLING
Filed Aug. 6, 1963
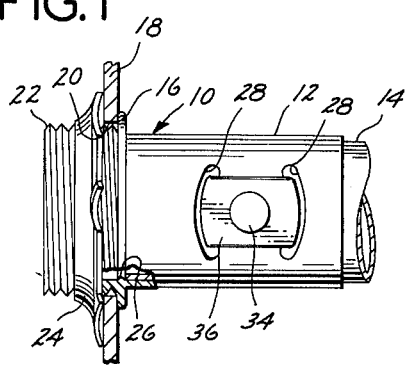
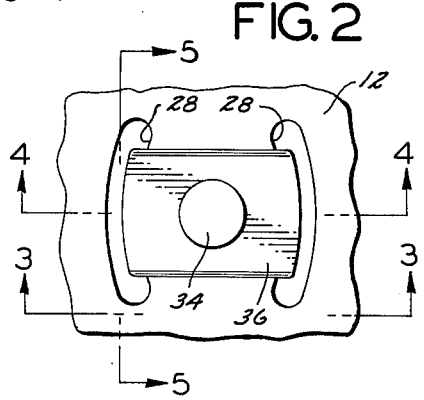
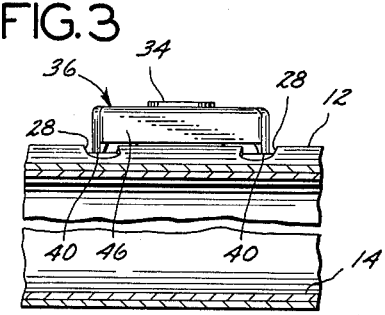
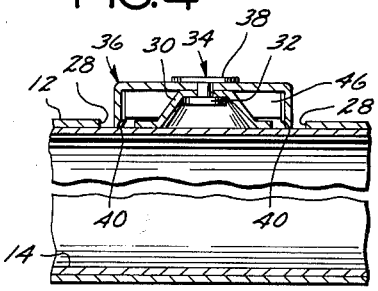
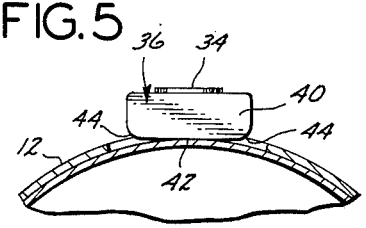
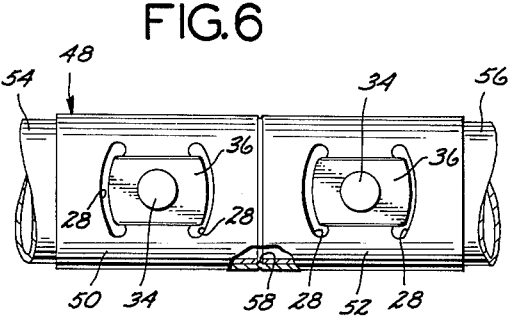
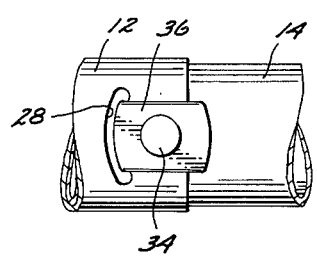
*INVENTOR.*
MARION E. ROGERS
BY FULWIDER, PATTON,
RIEBER, LEE & UTECHT
ATTORNEYS United States Patent Office 3,239,253
Patented Mar. 8, 1966

3,239,253
CONNECTOR-COUPLING
Marion E. Rodgers, 10612 La Alba Drive,
Whittier, Calif.
Filed Aug. 6, 1963, Ser. No. 300,292
5 Claims. (Cl. 285—320)

The present invention relates to a connector-coupling, and more particularly to a connector-coupling which is adapted to disengageably secure a conduit in position.

A number of devices are presently available for connecting one extremity of a length of conduit to an electrical junction box and for connecting adjacent extremities of a pair of conduit lengths. Most of these devices are of multi-component construction and are completely inoperative if one of the components is lost or misplaced. Thus, a typical prior art device of this type comprises a sleeve for receiving one end of the conduit to be secured, and a screw adapted to fit within a threaded, transversely oriented, opening provided in the sleeve. The screw is tightened to press the conduit against the wall of the sleeve opposite the screw, but if backed out too far preparatory to insertion of the conduit falls out and is easily lost in the usual debris found on a construction job. Moreover, since the screw requires the use of a screw driver to position it, the coupling device can only be used in areas affording sufficient freedom of movement to insert and operate the screw driver.

Certain devices of the prior art are of unitary or one-piece construction, but usually afford a substantially permanent coupling. Typically, such devices employ a sleeve having inwardly disposed teeth past which the conduit extremity is driven for seating the conduit within the sleeve. However, if the teeth are made to provide a tight and effective connection adequate to prevent the conduit from being pulled out of the sleeve during service, they are equally effective to prevent an electrician from removing the conduit when necessary for maintenance or other purposes. Various other devices heretofore proposed for obviating the above-described difficulties have largely failed to gain public acceptance, sometimes because of a lack of compliance with municipal and other building codes, but more often because the devices are relatively expensive and require excessive installation time.

Accordingly, it is an object of the present invention to provide a connector-coupling which is relatively inexpensive to manufacture, which is easy to install and operate, and which is characterized by reliability and long service life.

Another object of the invention is to provide a connector-coupling forming a part of a fitting adapted for mounting upon an electrical junction box, and wherein the connector coupling is of unitary construction adapted to receive one extremity of a length of conduit and firmly constrain it against accidental removal. However, the connector-coupling engages the conduit in a manner such that the conduit may be removed by rotation of a locking element forming a part of the connector-coupling.

Another object of the invention is to provide a connector-coupling which is adapted to mate with an extremity of a length of conduit, and which includes a locking element having an edge and adapted for pivotal movement to orient the edge transversely of the longitudinal axis of the conduit and in engagement with the conduit to form a transverse indentation therein to constrain the conduit against longitudinal movement and separation from the connector-coupling. The locking element can be rotated in one direction for such constraint, and rotated in the opposite direction to disengage the locking element from the conduit to permit axial withdrawal of the conduit, as by pulling upon it.

A further object of the invention is to provide a connector-coupling of the aforementioned character including a cylindrical sleeve incorporating an opening through which the cutting edge of the locking element is operative to form the aforementioned transverse indentation or groove in the enclosed conduit, the cutting edge preferably being made of a material which is harder than that of the conduit so as to facilitate the formation of such indentation. The locking element cutting edge "digs" or bites into the material of the conduit after rotation thereof into the opening in the sleeve and securely maintains the conduit in position, and opposes axial withdrawal thereof. Moreover, the configuration of the cutting edge is preferably such that the transverse indentation is not entirely straight, but is characterized by a slight curvature so that rotation of the conduit relative to the enclosing sleeve is substantially prevented, as well as prevention of axial withdrawal thereof.

Another object of the invention is to provide a connector-coupling of the aforementioned character in which the locking element is rotatably mounted to a sleeve for receiving an extremity of a length of conduit, the locking element being located intermediate a pair of arcuate openings provided in the sleeve, the locking element being provided with end margins incorporating flanges constituting the cutting edges operative through such openings, and the side margins of the locking element being formed into flanges which function as stiffeners to reduce or substantially prevent longitudinal deflection of the locking element with respect to the sleeve during engagement between the cutting edges of the locking element and the conduit within the sleeve.

A further object of the invention is the provision of a connector-coupling adapted for use in securing an extremity of a length of conduit to a structure such as an electrical junction box or the like, and also for use in a fitting having a pair of cylindrical end portions which are each provided with a locking element whereby a pair of adjacent conduits may be coupled, whether such conduits be arranged coaxially or at an angle to each other.

Another object of the invention is to provide a connector-coupling of the aforementioned character which is adapted for securing together pipe, tubing, and other forms of conduit, in addition to the usual electrical conduit for which it is particularly adapted.

Yet another object of the invention is to provide a connector-coupling of the aforementioned character utilizing a locking element which may be operated to securely engage the conduit and maintain it in position within the sleeve associated with the locking element, and wherein the locking element may also be rotated or pivoted in an opposite direction to disengage the conduit to permit easy withdrawal thereof.

Other objects and features of the invention will become apparent from consideration of the following description taken in connection with the accompanying drawings, in which:

FIG. 1 is a side elevational view of an electrical junction box fitting which includes a connector-coupling according to the present invention;

FIG. 2 is an enlarged, fragmentary view of the locking element and the adjacent sleeve shown in FIG. 1;

FIG. 3 is a view taken along the line 3—3 of FIG. 2;

FIG. 4 is a view taken along the line 4—4 of FIG.2;

FIG. 5 is a view taken along the line 5—5 of FIG. 2;

FIG. 6 is a side elevational view of a connector-coupling adapted to secure together adjacent extremities of a pair of elongated conduits; and FIG. 7 is a plan view, similar to the showing of FIG. 1, but illustrating another embodiment of the present connector-coupling.

Referring now to the drawing, and particularly to FIGS. 1 through 5 thereof, there is illustrated an electrical junction box fitting 10 which includes an elongated, cylindrical sleeve 12 open at one end to coaxially receive an extremity of a conduit 14. The opposite end of the sleeve 12 is integral with a larger diameter circumferential flange 16 which seats against a wall 18 of the electrical junction box (not shown) when the fitting 10 is inserted into an opening 20 provided in the junction box wall 18.

The extremity of the fitting 10 opposite the sleeve 12 includes usual male threads 22 which are cut or pressed into the material of the fitting 10, as by deforming the same in a manner well known to those skilled in the art, and a usual castellated nut 24 is mounted upon the threads 22, the sharp teeth thereof biting into the inner surface of the wall 18 to securely mount the fitting 10 in position upon the electrical junction box.

The fitting 10 also includes an internal annular stop or shoulder 26 adjacent the flange 16, and which is engaged by the end of the inserted conduit 14 to orient the conduit 14 in proper position within the sleeve 12.

The sleeve 12 includes a pair of longitudinally spaced, arcuate openings 28 which are punched or otherwise formed out of the material of the sleeve 12, it being apparent that the openings 28 provide access to the exterior surface of the conduit 14 from the exterior of the sleeve 12 when the conduit 14 is inserted within the sleeve 12 in substantially perimetrical contiguity.

The wall of the sleeve 12 intermediate or between the openings 28 is outwardly deformed by any suitable means to provide a mounting projection or dimple 30, as best viewed in FIG. 4, which is substantially circular in configuration and provides a recessed cavity for receipt of a head 32 of a rivet 34 or other suitable fastener.

An elongated cam or locking element 36 is mounted to the sleeve 12 and for this purpose includes a body portion having a central opening for receiving the shank of the rivet 34 whereby the locking element 36 is rotatable or pivotable upon the dimple 30, the upper extremity of the rivet 34 being upset to provide a headed end 38 to secure the locking element 36 in position. Of course, the locking element 36 may be rotatably mounted to the sleeve 12 in any suitable manner, as desired, but the dimple 30 and rivet 34 afford a simple and relatively inexpensive means for accomplishing this purpose.

The locking element 36 includes end margins characterized by integral, inwardly disposed legs or flanges having sharp cutting edges 40, as best viewed in FIGS. 4 and 5, it being noted that the cutting edges 40 are each characterized by a substantially straight middle portion 42 and around end margins 44, the purpose of which will become apparent hereinafter. Referring to FIG. 2, it will also be noted that the cutting edges 40 are each preferably characterized by an arcuate configuration when viewed in plan.

The locking element 36 also includes side margins characterized by integral flanges wihch constitute longitudinal stiffeners 46, the stiffeners 46 serving to reduce or substantially prevent longitudinal deflection of the projecting legs or portions of the locking element 36 which extend radially outwardly of the rivet 34 and incorporate the cutting edges 40.

With this arrangement, the conduit 14 may be rigidly secured within the sleeve 12 of the junction box fitting 10 by rotating or pivoting the locking element 36 from a position in which the cutting edges 40 thereof are out of registry with the openings 28 into a position in which the cutting edges 40 pass into the openings 28 and into engagement with the exterior surface of the conduit 14. Continued pivotal movement of the locking element 36 effects a digging or biting of the cutting edges 40 into the material of the conduit 14, providing substantially transversely oriented indentations or grooves. The material of the locking element 36 is preferably made of a material which is harder than that of the conduit 14 to facilitate such penetration of the exterior surface of the conduit 14 by the cutting edges 40.

The slightly arcuate configuration of the cutting edges 40, as viewed in plan in FIG. 2, lends a slight curvature to the transversely oriented indentations or grooves which tends to prevent rotation of the conduit 14 within the sleeve 12. Moreover, the rounded end margins 44 of the locking element's cutting edges 40 affords easy initial engagement of the cutting edges 40 with the conduit 14, and the substantially straight middle portion 42 of each of the cutting edges 40 applies a considerable and substantially uniform pressure upon the conduit 14 so as to firmly anchor the conduit 14 in position. Of course, the straight middle portion 42 of each cutting edge 40 could be provided with a slight convexity to progressively more deeply bite into the material of the conduit 14 if desired, but this is not preferred in that it is theorized that the cutting edges 40 would then tend to "ride" to one side and loosen the engagement thereof with the conduit 14, as under vibration or the like.

If desired, although not shown, the locking element 36 could be provided with a handle or tab to facilitate rotation thereof by hand, although it has been found that the locking element 36 is easily pivotable or rotatable with a pair of common pliers.

The engagement between the cutting edges 40 and the conduit 14 is comparatively forcible, and it will be understood that the dimensions of the various components of the connector-coupling are proportional to accomplish this. In order to maintain this forcible interengagement it is important to reduce or prevent upward deflection of the projecting legs of the locking element 36 which might permit relief of the locking pressure of the cutting edges 40 against the conduit 14, and the integral stiffeners 46 serve this purpose, although it will be apparent that this could also be accomplished by utilizing a thicker cross-section or higher grade of steel in the locking element 36, but this would of course be relatively more expensive than the structure described.

Although the locking element 36 could be provided with a single cutting edge 40 operative through a single opening 28 provided in the sleeve 12, the provision of the two cutting edges 40 provides a balanced construction which tends to better maintain the forcible engagement with the conduit 14, the engagement of one cutting edge 40 with the conduit 14 serving to constrain the opposite cutting edge 40 against upward deflection.

As best viewed in FIG. 7, the locking element 36 may be mounted adjacent the end extremity of the sleeve 12 so that a cutting edge 40 thereof is adapted to engage the conduit 14 without acting through an opening 28. If desired, in this alternative embodiment, the locking element 36 could also be provided with an oppositely disposed cutting edge 40 operative through one opening 28 provided in the sleeve 12.

Referring now to FIG. 6, there is illustrated an open-ended fitting 48 having a pair of aligned, cylindrical end portions 50 and 52 which are adapted to coaxially receive, respectively, the adjacent extremities of a pair of elongated conduits 54 and 56. The fitting 48 includes an internal annular stop or shoulder 58 intermediate the end portions 50 and 52 and against which the conduits 54 and 56 abut to properly locate them within the fitting 48.

Each of the end portions 50 and 52 is provided with a pair of longitudinally spaced arcuate openings 20 of the character previously described in connection with the fitting 10 of FIGS. 1 through 5, whereby the fitting 48 is adapted to disengageably couple the conduits 54 and 56.

Although the fitting 48 includes aligned or coaxially arranged end portions 50 and 52, it could be made with the end portions arranged at an angle so as to be capable of coupling associated conduits which are not coaxial with each other but are instead arranged at a 45 or 90° angle to each other, for example. Moreover, although the description hereinabove made has been directed primarily to the utilization of the present invention in conjunction with conventional electrical conduit, it will be obvious that the invention is equally adapted for coupling conduits such as pipe or tubing or the like.

Thus the present invention provides a connector-coupling adapted to quickly and easily couple together a pair of conduits, or couple a conduit to a fitting such as an electrical junction box, which prevents axial withdrawal of the conduit or conduits except upon pivotal releasing movment of the locking elements and which permits ready separation of the conduit upon rotation of the locking elements approximately 45°, out of positions of engagement with such conduit or conduits.

Various modifications and changes may be made with regard to the foregoing detailed description without departing from the spirit of the invention or the scope of the following claims.

I claim:
1. A connector-coupling comprising:
  a cylindrical sleeve adapted to coaxially receive an extremity of a length of conduit;
  and locking means carried by said sleeve, said locking means including a locking element having a body portion and a pair of legs carried by said body portion, said legs extending radially inwardly toward the longitudinal axis of said sleeve and terminating in a means for digging into the outer wall surface of said conduit, pivot means mounting said body portion to the outer peripheral surface of said sleeve, transversely oriented slots extending completely through the wall of said sleeve and being of a width and length and so positioned relative to said pivot means as to freely receive said legs of said locking element as same is actuated about its pivot, said legs being so proportioned that when said legs are received by said slots, said means of said legs will project beyond the inner peripheral wall of said sleeve to dig into the outer wall surface of said conduit to thereby releaseably restrain said sleeve and said conduit against relative axial movement.

2. A connector-coupling according to claim 1 wherein said body portion includes side margins having flanges extending between said legs and constituting stiffeners to constrain said locking element against deflection upon digging of said means of said legs into the outer wall surface of said conduit.

3. A connector-coupling according to claim 1 wherein said locking element is made of a material which is hard compared to that of said conduit to thereby facilitate digging of said means of said legs into the outer wall surface of said conduit.

4. A connector-coupling according to claim 1 wherein said means of said legs are constituted by sharpened cutting edges provided on said legs.

5. A connector-coupling comprising:
  an open-ended cylindrical sleeve having internal stop means and adapted to coaxially receive the extremities of a pair of lengths of conduit within its opposite ends and in engagement with said stop means;
  and a pair of locking means carried by said sleeve on opposite sides of said stop means, each of said locking means including a locking element having a body portion and a pair of legs carried by said body portion, said legs extending radially inwardly toward the longitudinal axis of said sleeve and terminating in a means for digging into the outer wall surface of the associated one of said lengths of conduit, pivot means mounting said body portion to the outer peripheral surface of said sleeve, a pair of transversely oriented slots adjacent said locking element and extending completely through the wall of said sleeve and being of a width and length and so positioned relative to said pivot means that said pair of slots freely receives said legs of said locking element as same is actuated about its pivot, all of said legs of said pair of locking means being so proportioned that when said legs are received by said slots, said means of said legs will project beyond the inner peripheral wall of said sleeve to dig into the outer wall surface of said lengths of conduit to thereby releaseably restrain said sleeve and said lengths of conduit against relative axial movement.

References Cited by the Examiner

UNITED STATES PATENTS

| | | | |
|---|---|---|---|
| 484,656 | 10/1892 | Doolittle | 285—358 X |
| 1,889,133 | 11/1932 | Pfefferle | 285—320 X |
| 2,427,399 | 9/1947 | Fortin | 306—28 |
| 2,630,835 | 3/1953 | Russell | 285—420 X |
| 2,771,908 | 11/1956 | Wilson | 285—223 X |
| 2,823,945 | 2/1958 | Tillson | 279—77 X |

FOREIGN PATENTS

| | | |
|---|---|---|
| 560,054 | 6/1923 | France. |
| 488,981 | 7/1938 | Great Britain. |

CARL W. TOMLIN, *Primary Examiner.*